(12) United States Patent
Burns et al.

(10) Patent No.: US 9,204,710 B1
(45) Date of Patent: Dec. 8, 2015

(54) ROTATIONAL SUPPORTING DEVICE AND SYSTEM

(75) Inventors: Michael Lawrence Burns, Ann Arbor, MI (US); Daniel Patrick Burns, Fenton, MI (US); John Mark Wilson, Trenton, MI (US)

(73) Assignee: HAND E HOLDER PRODUCTS, INC., Ann Arbor, MI (US)

( * ) Notice: Subject to any disclaimer, the term of this patent is extended or adjusted under 35 U.S.C. 154(b) by 76 days.

(21) Appl. No.: 13/101,310

(22) Filed: May 5, 2011

Related U.S. Application Data

(60) Provisional application No. 61/334,035, filed on May 12, 2010.

(51) Int. Cl.
*A45F 5/00* (2006.01)
*A45F 5/10* (2006.01)
*G06F 1/16* (2006.01)
*H04B 1/3827* (2015.01)

(52) U.S. Cl.
CPC . *A45F 5/00* (2013.01); *A45F 5/102* (2013.01); *G06F 1/163* (2013.01); *A45F 2005/006* (2013.01); *A45F 2005/1006* (2013.01); *A45F 2005/1013* (2013.01); *A45F 2200/0516* (2013.01); *A45F 2200/0525* (2013.01); *H04B 2001/3861* (2013.01)

(58) Field of Classification Search
CPC ..... A45F 5/00; A45F 5/102; A45F 2005/006; A45F 2005/008; A45F 2005/1006; A45F 2005/1013; A45F 2200/0516; A45F 2200/0525; H04B 2001/3861; G06F 1/163
USPC .......... 248/415, 683; 224/218, 267, 197, 219, 224/222, 901.4, 901.6, 901.8; 24/3.2; 294/170, 25
See application file for complete search history.

(56) References Cited

U.S. PATENT DOCUMENTS

| | | | | |
|---|---|---|---|---|
| 5,201,444 | A * | 4/1993 | Simonet | 224/183 |
| 5,412,545 | A * | 5/1995 | Rising | 362/105 |
| 5,489,051 | A * | 2/1996 | Robinson | 224/148.4 |
| 6,116,484 | A | 9/2000 | Allen | |
| 6,161,740 | A | 12/2000 | Allen | |
| 6,360,928 | B1 | 3/2002 | Russo | |
| 6,726,070 | B2 | 4/2004 | Lautner | |
| 7,296,752 | B2 * | 11/2007 | Carnevali | 235/462.44 |
| 7,334,711 | B1 | 2/2008 | Winters | |
| 7,428,143 | B1 | 9/2008 | Jones et al. | |
| 7,533,449 | B2 * | 5/2009 | Hsu | 16/367 |
| 8,517,233 | B2 * | 8/2013 | Podda-Heubach | 224/183 |
| 8,550,317 | B2 * | 10/2013 | Hyseni | 224/197 |

(Continued)

*Primary Examiner* — Terrell McKinnon
*Assistant Examiner* — Eret McNichols
(74) *Attorney, Agent, or Firm* — Dykema Gossett PLLC

(57) ABSTRACT

A supporting device for an object comprises a support plate, a base plate, a pivot device, and a fastening device. The pivot device allows the base plate to rotate 360 relative to the support plate. The fastening device has a first member and a second member. The first member has a first side including a plurality of projections and a second side including a first adhesive that attaches the first member to the base plate. The second member has a first side including a plurality of projections and a second side including a second adhesive that attaches the second member to the object. The plurality of projections of the first member and the second member removably connect the first member to the second member, and disconnect only after a separation force is applied. Various supporting systems for objects are employed using the supporting device.

11 Claims, 7 Drawing Sheets

(56) References Cited

U.S. PATENT DOCUMENTS

| | | | |
|---|---|---|---|
| 8,662,362 B1* | 3/2014 | Bastian et al. | 224/218 |
| 8,714,421 B2* | 5/2014 | Norling | 224/197 |
| 8,714,422 B2* | 5/2014 | Yu | 224/219 |
| 8,740,270 B1* | 6/2014 | Mizell et al. | 294/25 |
| 8,783,533 B1* | 7/2014 | Marseille | 224/218 |
| 8,833,820 B1* | 9/2014 | Hill | 294/25 |
| 8,939,482 B2* | 1/2015 | Rasmussen et al. | 294/25 |
| 2004/0226973 A1 | 11/2004 | Kao | |
| 2004/0251285 A1* | 12/2004 | O'Neill | 224/221 |
| 2007/0012736 A1* | 1/2007 | Wagner | 224/218 |
| 2009/0090753 A1* | 4/2009 | Irvin | 224/218 |
| 2009/0321483 A1* | 12/2009 | Froloff | 224/267 |
| 2010/0005626 A1* | 1/2010 | Wang et al. | 16/367 |
| 2011/0247959 A1* | 10/2011 | Nelson | 206/525 |
| 2011/0279959 A1* | 11/2011 | Lopez | 361/679.03 |
| 2011/0299231 A1* | 12/2011 | Gaddis et al. | 361/679.01 |
| 2011/0303709 A1* | 12/2011 | Wizikowski | 224/218 |
| 2012/0024918 A1* | 2/2012 | DeCamp et al. | 224/267 |
| 2012/0111881 A1* | 5/2012 | Gaddis et al. | 220/752 |
| 2012/0182680 A1* | 7/2012 | Wetzel et al. | 361/679.06 |
| 2012/0255978 A1* | 10/2012 | Williams | 224/219 |
| 2013/0005412 A1* | 1/2013 | McCurdy | 455/575.6 |
| 2013/0043290 A1* | 2/2013 | Prater et al. | 224/567 |
| 2013/0082078 A1* | 4/2013 | Totani et al. | 224/219 |
| 2013/0240578 A1* | 9/2013 | Yu | 224/197 |
| 2013/0256348 A1* | 10/2013 | Seuk | 224/267 |
| 2013/0295549 A1* | 11/2013 | Hills | 434/379 |
| 2013/0299365 A1* | 11/2013 | Andrew | 206/37 |
| 2013/0300141 A1* | 11/2013 | Byrne | 294/25 |
| 2014/0091116 A1* | 4/2014 | Yu | 224/218 |
| 2014/0159402 A1* | 6/2014 | Madrid | 294/137 |

* cited by examiner

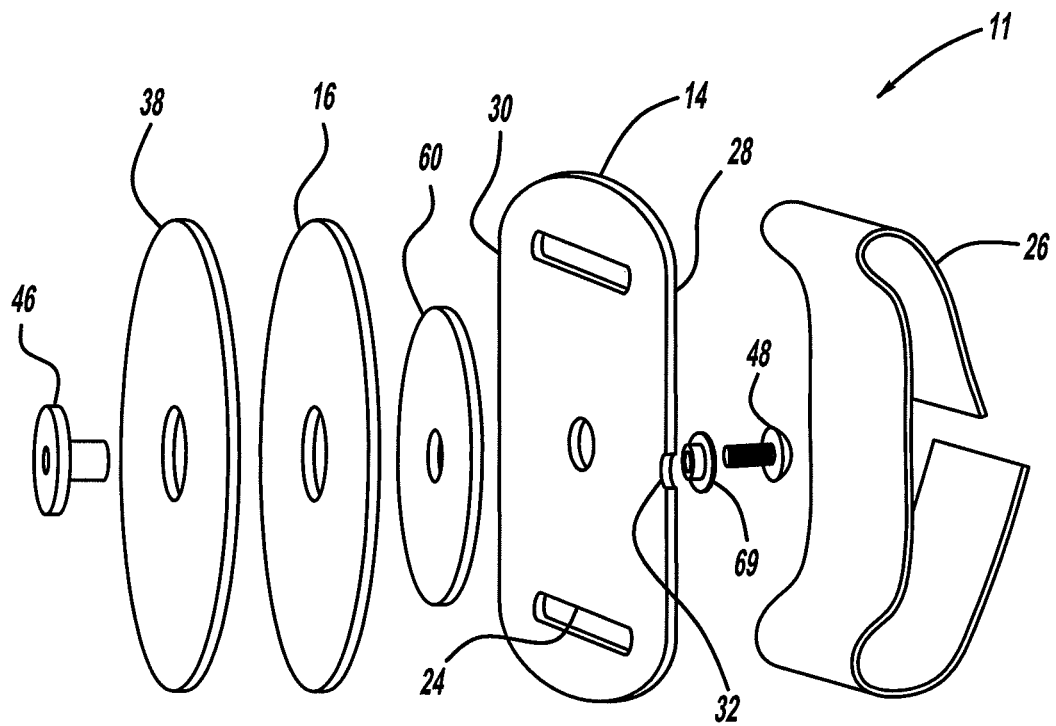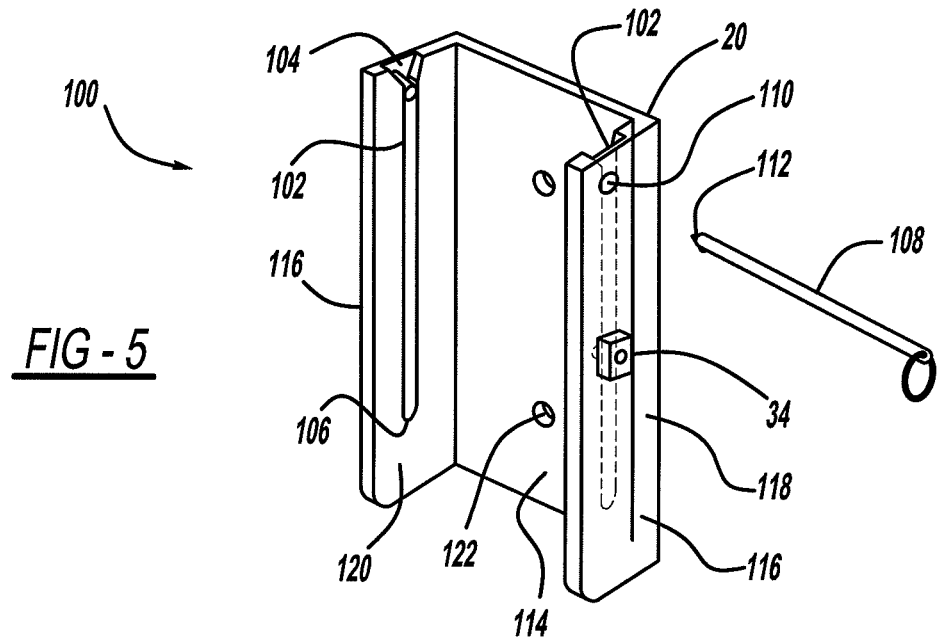
FIG-5

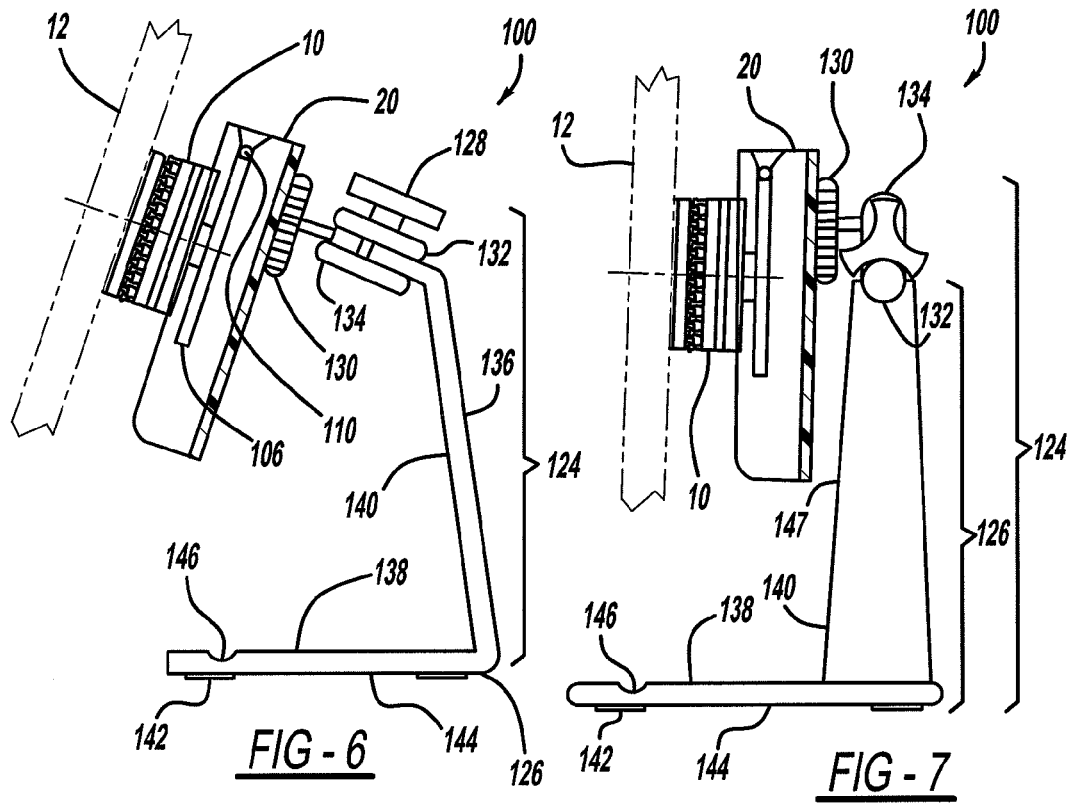
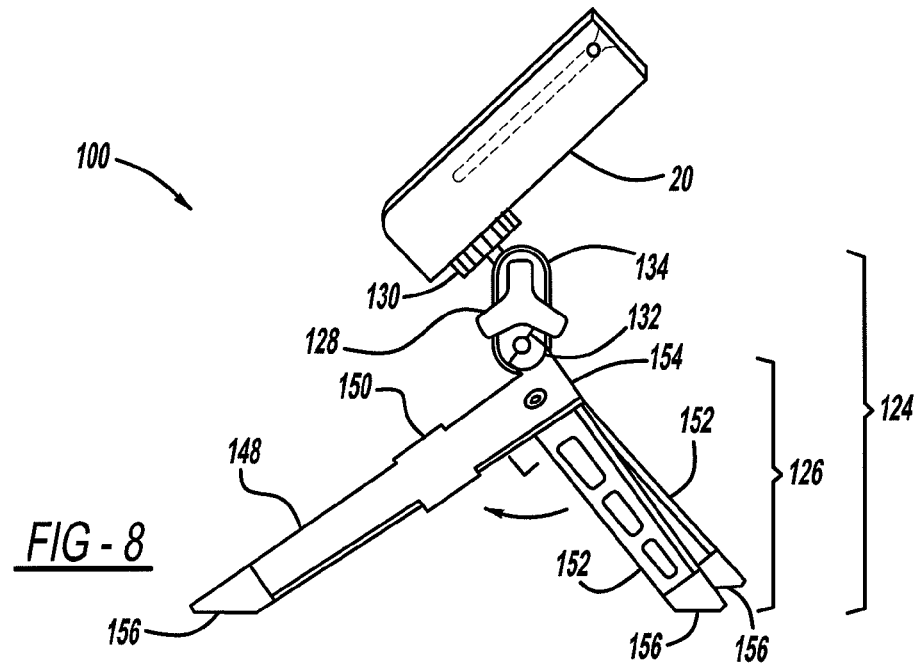

ROTATIONAL SUPPORTING DEVICE AND SYSTEM

CROSS REFERENCE TO RELATED APPLICATION

This application claims the benefit of U.S. Provisional Application No. 61/334,035, filed May 12, 2010, which is hereby incorporated by reference as though fully set forth herein.

TECHNICAL FIELD

The invention relates generally to an apparatus and system for supporting objects that may allow unlimited rotation of the object and may be removably attached to the object.

BACKGROUND

Various objects, such as tablet computers, electronic reading devices ("e-readers"), clipboards, cell phones, media player, and other similar objects may be held with one hand. For example, a person holding a tablet computer may support the tablet computer with one hand on the back of the tablet computer while interfacing with the touch screen with the other hand. Holding the object with one hand, however, may be cumbersome and present the problem that the object may be dropped and potentially damage the object. Additionally, holding the object with one hand may be non-ergonomical. When the object is held by one hand by grasping and/or pinching the side of the object, the person's hand may become quickly fatigued. Also, the person may wish to rotate the object without awkwardly or uncomfortably changing the person's preferred and/or unique position of their hand while holding the object.

There are also situations when the person may desire to not use either of their hands to hold and/or support the object. For example, the tablet computer may be used in conjunction with an auxiliary physical keyboard and the person may desire to type on the keyboard with both hands. Other examples may include situations when the person may use the tablet computer while cooking (such as showing a recipe), as a picture frame display, as a map and/or GPS driving accessory in a vehicle, while reading, while exercising (reading or watching video while on stationary exercise equipment), while the object is being charged, and other similar activities when the person would prefer not to hold the object.

Additionally, there may be situations when the person may want the object to be as small and/or thin as possible and therefore not be connected to any additional supporting devices. For example, when a person is already securely holding the device, such as transporting the object in a bag, the person may want to be able to quickly and easily connect and disconnect a supporting device from the object as the person's needs arise.

Therefore, it may be desirable to have a supporting apparatus that allows a person to securely hold and/or support an object with one hand and comfortably rotate the object without the need to change the position of the person's hand. It may also be desirable to have the apparatus be easily and quickly connected and disconnected from the object. It also may be desirable to have a supporting system utilizing the supporting apparatus that allows the object to be held and supported without the need for any of the person's hands.

SUMMARY

In an embodiment, a supporting device for an object may comprise a support plate, a base plate, a pivot device, and a fastening device. The pivot device may have a centerline axis and may be configured to attach the base plate to the support plate. The base plate may be configured to rotate 360 degrees about the centerline axis of the pivot device relative to the support plate. The fastening device may have a first member and a second member. The first member may have a first side having a plurality of projections and a second side having a first adhesive configured to attach the first member to the base plate. The second member may have a first side having a plurality of projections and a second side having a second adhesive configured to attach the second member to the object. The plurality of projections of the first side of the first member and the plurality of projections of the first side of the second member are configured to removably connect the first member to the second member. The first member may be configured to disconnect from the second member only after a separation force is applied to the first and second members.

In an embodiment, a supporting system for an object may comprise an adapter plate and a supporting device. The adapter plate may have a plurality of grooves, wherein each of the plurality of grooves has an open end and a closed end. The supporting device may comprise a support plate, a base plate, and a pivot device. The support plate may have a first edge and a second edge, wherein the first edge and the second edge of the support plate are each configured to engage one of the plurality of grooves in the adapter plate. The support plate may also be configured to be positioned relative to the adapter plate by engaging a portion of the support plate the closed end of at least one of the plurality of grooves. The pivot device may have a centerline axis and may be configured to attach the base plate to the support plate. The base plate may be configured for attachment to the object and may be configured to rotate 360 degrees about the centerline axis of the pivot device relative to the support plate.

In an embodiment, the supporting system may comprise a load-bearing device, an adapter plate, and a supporting device. The adapter plate may have a plurality of grooves that has an open end and a closed end, and the adapter plate may be configured to connect to the load-bearing device. The supporting device may comprise a support plate, a base plate, and a pivot device. The support plate may have a first edge and a second edge, wherein the first edge and the second edge of the support plate are each configured to engage one of the plurality of grooves in the adapter plate. The support plate may also be configured to be positioned relative to the adapter plate by engaging a portion of the support plate with the closed end of at least one of the plurality of grooves. The pivot device may have a centerline axis and may be configured to attach the base plate to the support plate. The base plate may be configured for attachment to the object and may be configured to rotate 360 degrees about the centerline axis of the pivot device relative to the support plate.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 5 is an exploded perspective view of an embodiment of the supporting system.

FIG. 6 is a partial side cross-sectional view of an embodiment of the supporting system including the adapter plate and the supporting device, illustrating the supporting device attached to an object.

FIG. 7 is a side view of an embodiment of the supporting system with the supporting device attached to the object.

FIG. 8 is a perspective view of an embodiment of the supporting system.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
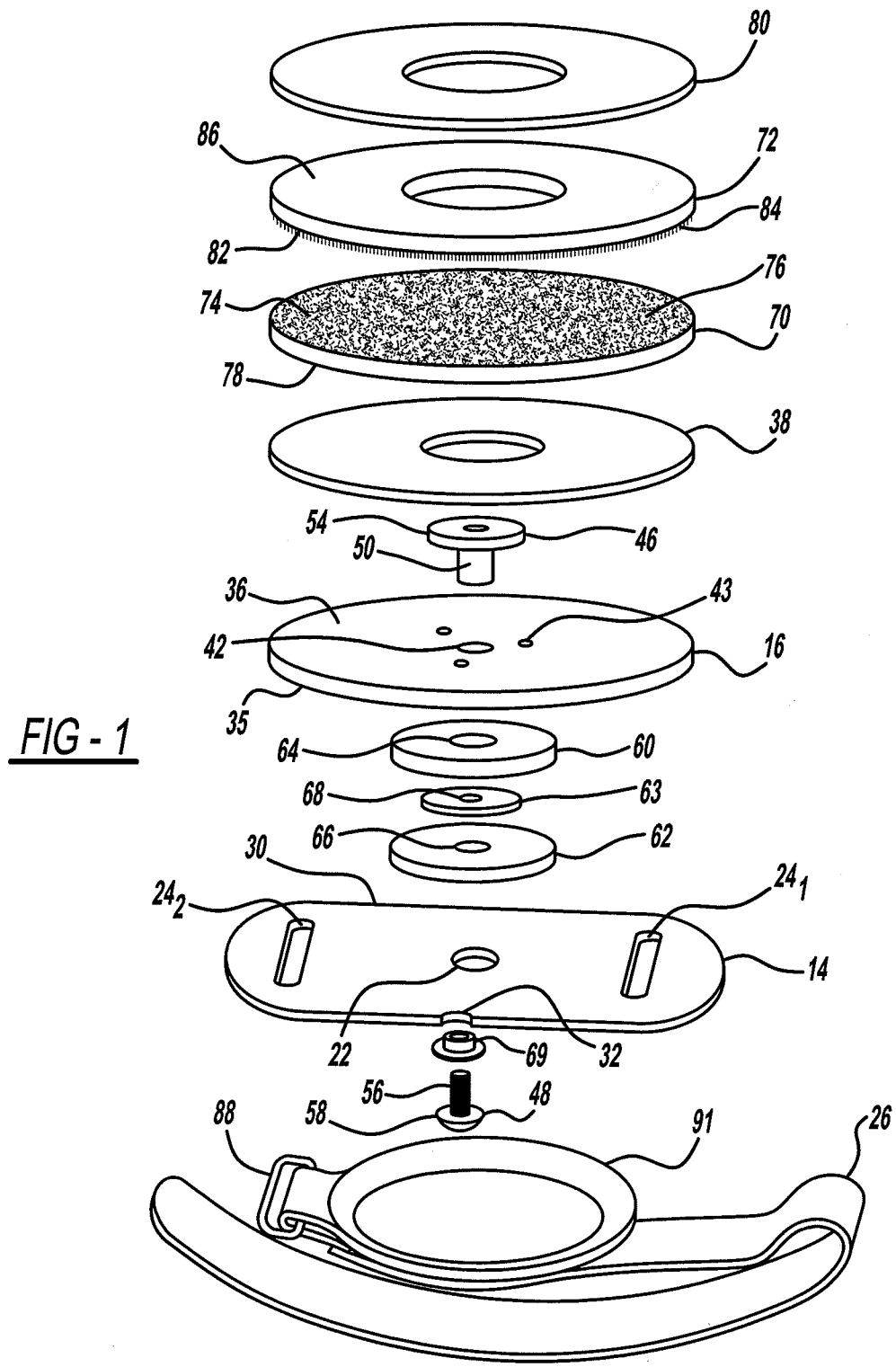
FIG. 1 is an exploded perspective view of an embodiment of the supporting device.
Figure 2:
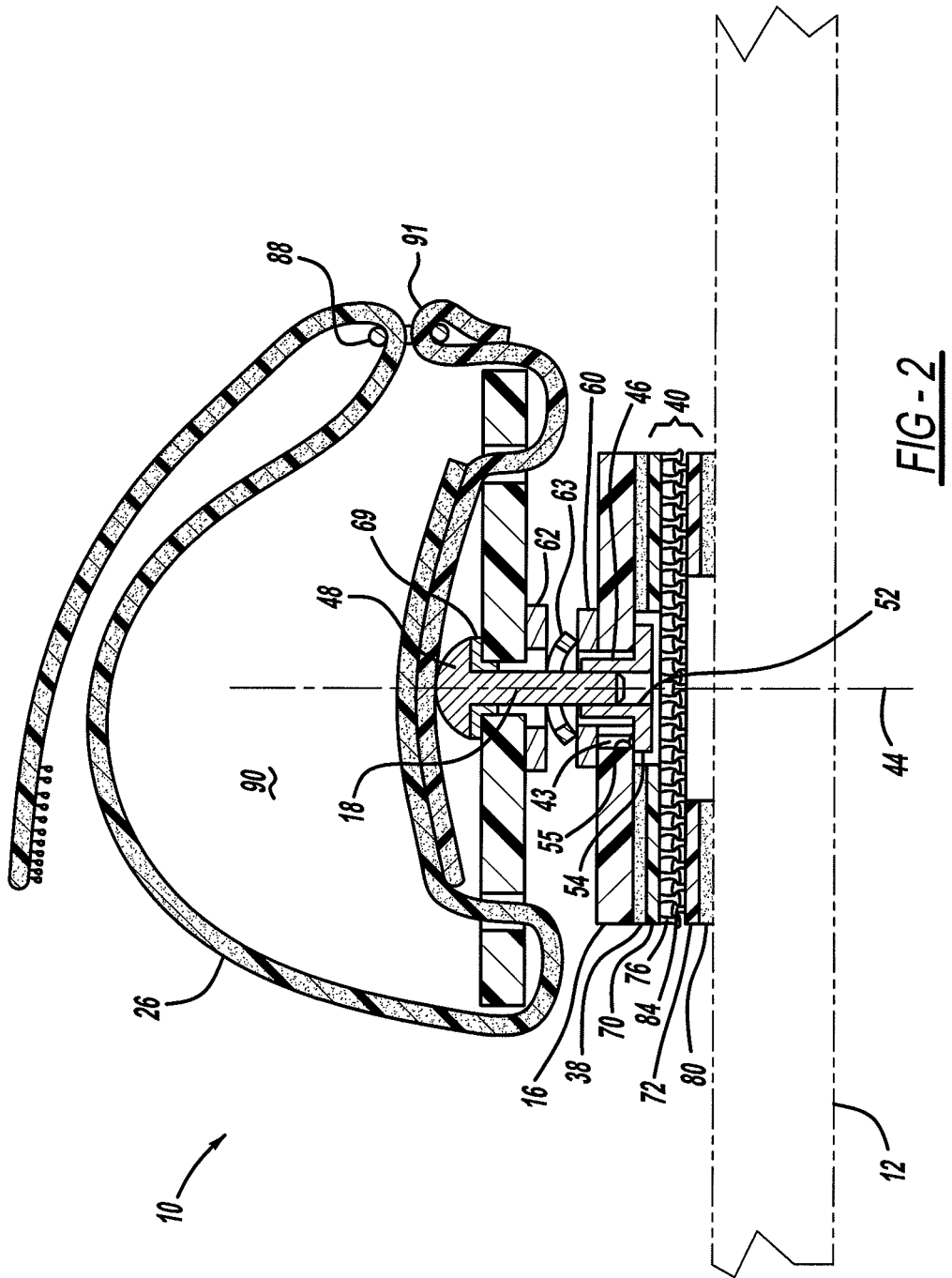
FIG. 2 is a cross-sectional side view of the embodiment of the supporting device shown in FIG. 1, illustrating the supporting device attached to an object.
Figure 3:
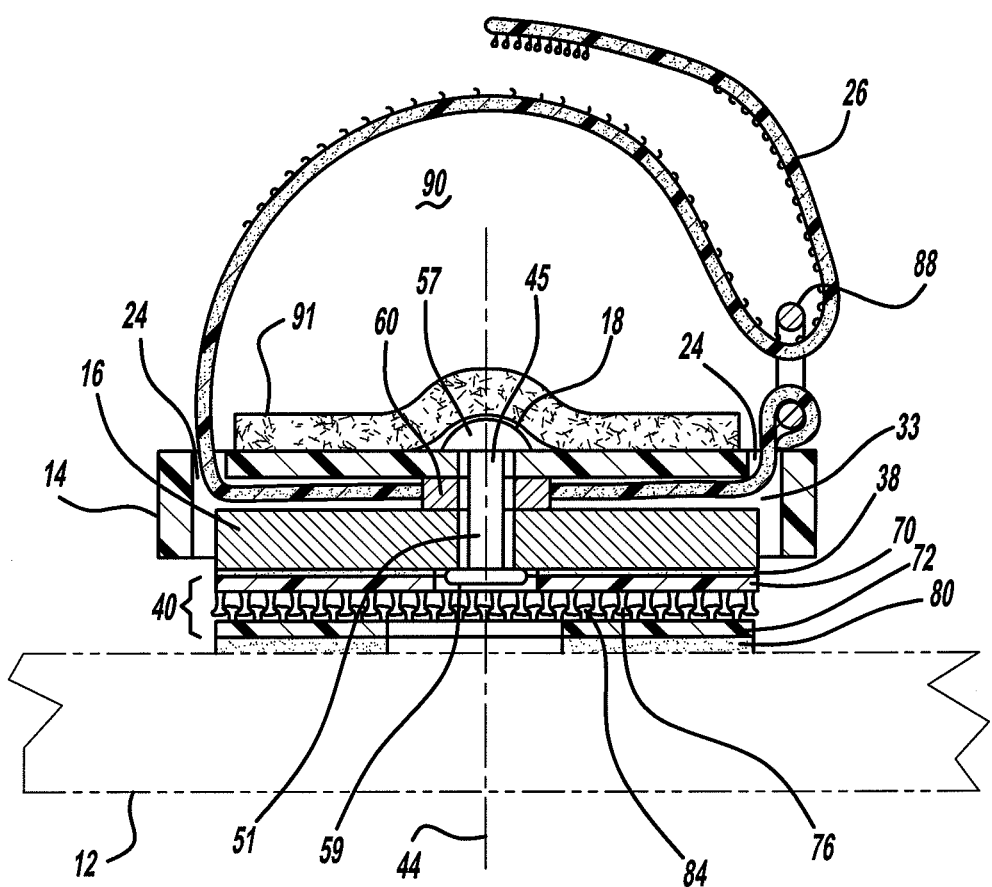
FIG. 3 is a cross-sectional side view of another embodiment of the supporting device, illustrating the supporting device attached to an object.

FIGS. 1-3 illustrate an exploded perspective view and cross-sectional side views of embodiments of a supporting device 10 configured to attach to an object 12. The supporting device 10 may comprise a support plate 14, a base plate 16, and a pivot device 18.

The support plate 14 may be the interface between the supporting device 10 and an article. For example and without limitation, the article may be an appendage (hands, arms, and legs of a person) or an inanimate object. In accordance with an embodiment of the invention, the article may comprise an adapter plate 20 (as seen in FIG. 3. and described in more detail below). For example, the support plate 14 may be placed in the palm of a person's hand or positioned on the thigh of a person's leg. In another example, the support plate 14 may interface to a seat in a vehicle where the attached object 12 may be viewed by occupants in the vehicle. In yet another example, the support plate 14 may interface with various embodiments of support stands (described in more detail below).

The support plate 14 may be flat and planar and may have a shape having two substantially parallel edges and two curved edges. Although the support plate 14 is described as being flat and planar, the support plate 14 may be curved or textured in accordance with other embodiments of the invention. Although the support plate 14 is described as having a shape having two substantially parallel edges and two curved edges in shape, the support plate 14 may be any number of various shapes in accordance with embodiments of the invention. The corners and edges of the support plate 14 may be curved or chamfered to improve the tactile comfort of the support plate 14 when interfacing with a person's appendage(s) in accordance with some embodiments, as well as to improve the ease of sliding the support plate 14 onto the adapter plate 20 in other embodiments. The support plate 14 may have a hole 22 located approximately in the center of the support plate 14. The hole 22 may be used to attach the pivot device 18 to the support plate 14. The support plate 14 may also have a plurality of slots 24. For example and without limitation, a first slot $24_1$ may be located near a first end of the support plate 14, and a second slot $24_2$ may be located near a second opposing end of the support plate 14. The support plate 14 may have a first edge 28 and a second edge 30 which may be substantially parallel to each other, and both the first edge 28 and the second edge 30 of the support plate 14 may be configured to interface with the adapter plate 20. The support plate 14 may have a notch 32 located on the first edge 28 or the second edge 30 which may be used to engage a detent mechanism 34 that may be attached to the adapter plate 20. The support plate 14 may be made of plastic in an embodiment of the invention. The plastic may be high strength/impact plastic, including, but not limited to, polyvinyl chloride (PVC), high density polypropylene (HDPP), polycarbonate (PC), acrylonitrile butadiene styrene (ABS), and PC/ABS. Although plastic is mentioned in detail, the support plate 14 may comprise any number of various materials in accordance with various embodiments of the invention.

In an embodiment, the support plate 14 may have a cavity 33. The cavity 33 may allow the supporting device 10 to have a lower overall profile because a portion of the base plate 16 may be disposed within the cavity 33 as seen in FIG. 3. The cavity 33 may be located on the side of the support plate 14 closest to the base plate 16. The cavity 33 may be substantially cylindrical in shape and may have a diameter which may be larger than the diameter of the base plate 16. The depth of the cavity 33 may be configured such that a portion of the base plate 16 extends out of the cavity 33 and another portion is disposed within the cavity 33. For example, the depth of the cavity 33 may be configured such that at least 50%, at least 75%, or 100% of the base plate 16 may be disposed within the cavity 33. The plurality of slots 24 may be located such that the opening in the support plate created by the plurality of slots 24 is connected to the cavity 33. Although particular shapes and depths of the cavity 33 have been mentioned in detail, the cavity 33 located in the support plate 14 may comprise additional sizes and depths in accordance with various embodiments of the invention.

The base plate 16 may be configured for attachment to the object 12. In an embodiment, the base plate 16 has a first surface 35 that is configured to face the support plate 14 and an opposing second surface 36 that may be configured to receive a first adhesive 38, such as industrial strength double sided tape, or other similar types of adhesive as known to those of skill in the art. The first adhesive 38 may be about the same size (e.g. width and length, or diameter) as the base plate 16 and may have a hole located approximately in the center of the first adhesive 38. Utilizing the first adhesive 38, the base plate may be attached to the object directly or indirectly. In an embodiment of the supporting device 10, as generally illustrated in FIGS. 1-2, the base plate 16 may be indirectly attached to the object 12. For example, the first adhesive 38 may be attached to a fastening device 40 (described in more detail below) which may allow the base plate 16 to be removably connected to the object 12 in accordance with an embodiment of the invention. In another embodiment of the supporting device 11, as generally illustrated in FIG. 5, the base plate 16 may also be directly attached to the object 12. For example, the first adhesive 38 may be directly applied to the object 12, thereby directly connecting the base plate 16 to the object 12 without an additional fastener in between the base plate 16 and the object 12 in accordance with an embodiment of the invention.

The base plate 16 may be flat and planar and may be substantially circular in shape. Although the base plate 16 is described as being flat and planar, the base plate 16 may be curved or textured in accordance with other embodiments of the invention. Although the base plate 16 is described as being substantially circular in shape, the base plate 16 may be any number of various shapes in accordance with embodiments of the invention. In an embodiment, the base plate 16 may be approximately three inches in diameter. Although a diameter of three inches is mentioned in detail, the base plate 16 may have smaller and larger diameters in accordance with various embodiments of the invention. For example, in an embodiment where the supporting device is used with a smaller object 12, such as a phone, the base plate 16 may have a smaller diameter than three inches to proportionally match the smaller object 12. The base plate 16 may have a hole 42 located approximately in the center of the base plate 16 which may be used to attach the pivot device 18 to the base plate 16. The hole 42 in the base plate 16 may have a chamfer or countersink/counterbore feature. The base plate 16 may have a locating hole 43 or a plurality of locating holes 43 located proximate to the hole 42. The base plate 16 may be made of plastic. The plastic may be high strength/impact plastic, including, but not limited to, polyvinyl chloride (PVC), high density polypropylene (HDPP), polycarbonate (PC), acrylonitrile butadiene styrene (ABS), and PC/ABS. Although plastic is mentioned in detail, the base plate 16 may comprise any number of various materials in accordance with various embodiments of the invention.

Figure 4:
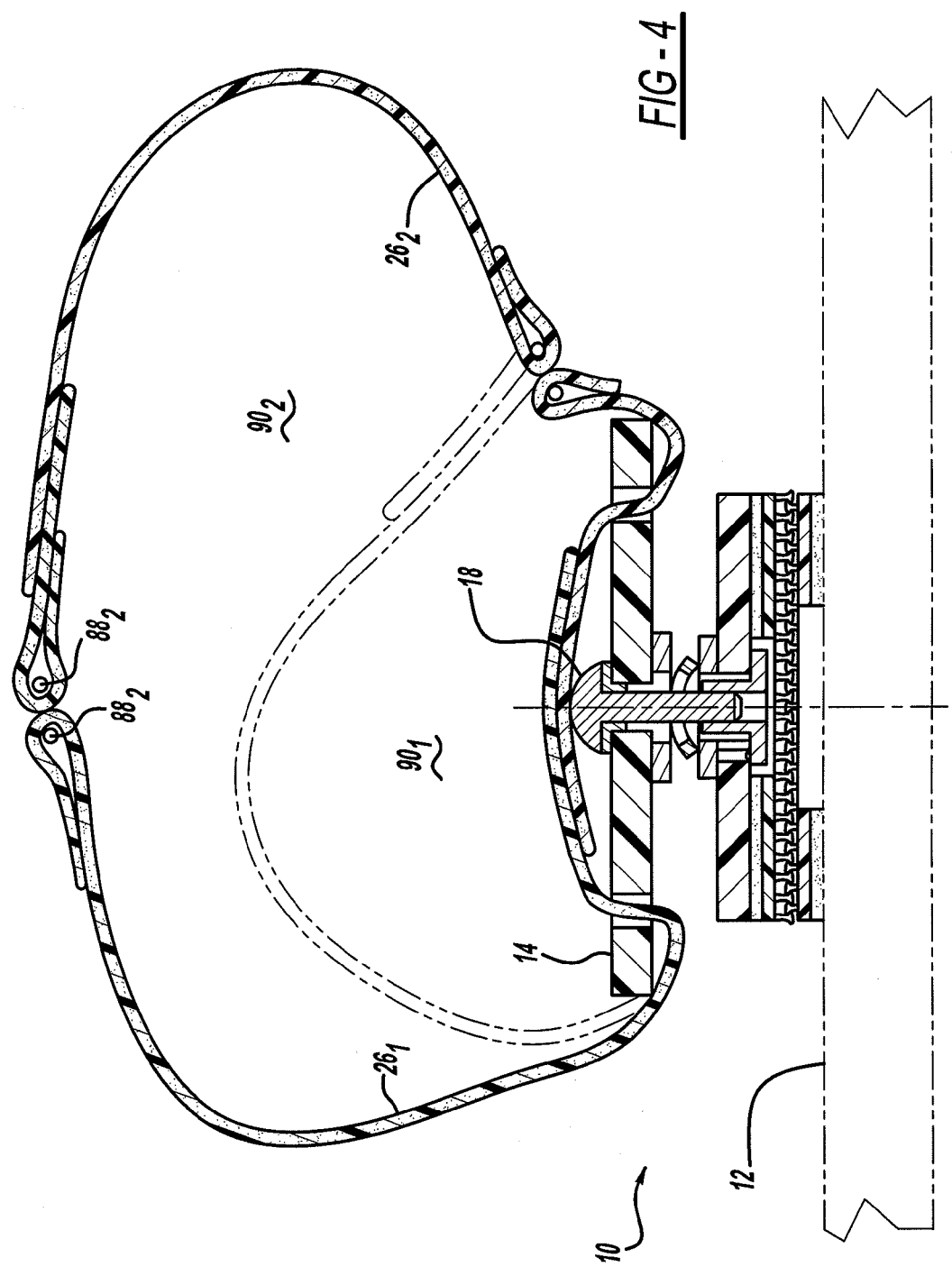
FIG. 4 is a cross-sectional side view of another embodiment of the supporting device shown in FIG. 1, illustrating the supporting device having a plurality of straps and the supporting device attached to an object.

The pivot device 18 may allow the base plate 16, and ultimately, the attached object 12 to rotate 360 degrees about a centerline axis 44 of the pivot device 18 relative to the support plate 14. In an embodiment, the pivot device 18 may comprise a t-nut 46 and a fastener 48 as seen in FIGS. 1, 2, and 4.

The t-nut 46 is a fastening nut having a body 50 with a threaded hole 52 and a flange 54. In an embodiment, the body 50 of the t-nut 46 may be cylindrical in shape. The t-nut 46 may be positioned such that the body 50 of the t-nut 46 may at least be partially placed through the hole 42 in the base plate 16. Depending on the length of the body 50 of the t-nut 46, the t-nut 46 may also be placed at least partially in the hole 22 in the support plate 14. The body 50 of the t-nut 46 may be sized such that the diameter of the body 50 of the t-nut 46 is slightly smaller than the holes 22, 42 in the base plate 16 and the support plate 14.

The flange 54 of the t-nut 46 may be sized such that the flange 54 is larger than the diameter of the hole 42 in the base plate 16 to allow the flange 54 to engage the second surface 36 of the base plate 16 that is configured to receive the first adhesive 38. Therefore, the flange 54 may limit the t-nut 46 from passing completely through the hole 42 in the base plate 16. The flange 54 may have at least one locating projection 55. The locating projection 55 may be positioned in the locating hole 43. The locating projection 55 may be sized such that there is a slight interference fit between the locating projection 55 and the locating hole 43. In an embodiment, the flange 54 may have three locating projections 55 to correspond with three locating holes 43 in the base plate 16. Although a quantity of three locating projections 55 have been described in detail, the flange 54 may have a different quantity of locating projections 55, including no locating projections 55, in accordance with various embodiments of the invention. In an alternative embodiment to having the flange 54 engaging the second surface of the base plate 16, the base plate 16 may have the chamfer or the counter-sink/counter-bore feature to allow the flange 54 to be flush or underflush to the second surface 36 of the base plate 16 that is configured to receive the first adhesive 38.

The fastener 48 may be a screw and/or bolt and may be configured to be threaded into the threaded hole 52 of the t-nut 46 and attach the base plate 16 to the support plate 14. The fastener 48 may have a body 56 with thread features and a head 58. The thread features of the fastener 48 may be coated with a thread-locking adhesive prior to attaching the fastener 48 to the t-nut 46. The fastener 48 may be positioned such that the body 56 of the fastener 48 may be placed through the hole 22 in the support plate 14. The head 58 of the fastener 48 may be sized such that the head 58 of the fastener 48 is larger than the diameter of the hole 22 in the support plate 14 to limit the head 58 from completely passing through the hole 22 in the support plate 14. The fastener 48 may be a cap screw, flat head screw, button head screw, pan head screw, countersunk screw, dome head screw, or any type of screw where the head 58 is larger than the body 56 of the fastener 48 as known to those with skill in the art.

The pivot device 18 may further comprise a first washer 60. The first washer 60 may be placed between the base plate 16 and the support plate 14 such that a portion of the first washer 60 may engage the base plate 16. The t-nut 46 and/or fastener 48 may be positioned through a hole 64 in the first washer 60. The base plate 16 and the support plate 14 may be separated by the thickness of the first washer 60. This separation may reduce how much force is required to rotate the base plate 16, and ultimately, the attached object 12. The first washer 60 may be coated with a lubricant to reduce the friction between the first washer 60 and the components the first washer 60 may be in contact with. The types of lubricants that may be used include a dry lubricant, such as a dry film graphite coating, a wet lubricant, such as grease or silicon, or other types of lubricants as known to those with skill in the art.

The pivot device 18 may further comprise a second washer 62 and a third washer 63. The first washer 60 may be positioned between the base plate 16 and the support plate 14 such that a portion of the first washer 60 may engage the base plate 16. The second washer 62 may be positioned between the base plate 16 and the support plate 14 such that a portion of the second washer 62 may engage the support plate 14. The third washer 63 may be positioned between the first washer 60 and the second washer 62. The second washer 62 and third washer 63 may also be coated with the same lubricate used on the first washer 60 to reduce the amount of friction between the components that may be in contact with each other. The third washer 63 may be a spring washer as known to those with skill in the art. A compression force caused when the fastener 48 is threaded into the t-nut 46 may compress the third washer 63. The predetermined amount of compression on the third washer 63 may be used to adjust the rotational resistance of the base plate 16 relative to the support plate 14. For example, in an embodiment, the amount of compression may be set using a predetermined torque when tightening the fastener 48 to the t-nut 46. The torque may be approximately 100 in/$lb_f$. The body 56 of the fastener 48 and/or the body 50 of the t-nut 46 may pass through a hole 66 in the second washer 62 and a hole 68 in the third washer 63. The diameter of the holes 64, 66, 68 in the first, second, and third washers 60, 62, 63 may be sized such that the holes 64, 66, 68 are slightly larger than the relevant portion of the pivot device 18, which may include the body 50 of the t-nut 46, the body 56 of the fastener 48, and/or any other type of fastening device which may be used by those with skill in the art. In an embodiment, the first, second, and third washers 60, 62, 63 may be made from metal. In an embodiment, the first washer 60 and/or second and third washers 62, 63 may be replaced with bearings, such as, but not limited to, ball bearings, to reduce the amount of force necessary to rotate the base plate 16, and ultimately, the attached object 12, relative to the support plate 14.

The pivot device 18 may further comprise a bushing 69. The bushing 69 may be positioned between the head 58 of the fastener 48 and at least a portion of the support plate 14. The bushing 69 may be sized that a portion of the bushing 69 is located in the hole 22 in the support plate 14. The bushing 69 may be used to reinforce the area proximate to the hole 22 in the support plate 14. The bushing 69 may be comprised of plastic.

In another embodiment, the pivot device 18 may comprise a rivet 45 as seen in FIG. 3. The rivet 45 may be used as an alternative fastening device to the t-nut 46 and the fastener 48. For example, the rivet 45 may be used to connect the base plate 16, the first washer 60, and the support plate 14 and may be configured to allow the base plate 16 to rotate relative to the support plate 14 about the centerline axis 44. The rivet 45 may have a body 51, a head 57, and a buck-tail 59. The body 51 of the rivet 45 may pass through the holes 22, 42, 64 in the support plate 14, the base plate 16, and the first washer 60. If additional washers are used, the body of the rivet may pass through the holes in those additional washers. The head 57 of the rivet 45 and the buck-tail 59 (when the buck-tail is upset or bucked) of the rivet 45 may be larger than the holes 22, 42 in the base plate 16 and the support plate 14, and therefore connect the components together. The rivet 45 may be oriented such that either the head 57 or the buck-tail 59 may engage either the support plate 14 or the base plate 16.

The supporting device 10 may further comprise the fastening device 40. The fastening device 40 may be used in embodiments where the base plate 16 and ultimately, the supporting device 10, are indirectly and/or removably connected to the object 12. The fastening device 40 may include a first member 70 and a second member 72. The first member 70 may be a first part of a reclosable fastener and may have a first side 74 with a plurality of projections 76. A second side 78 of the first member 70 may be attached to the first adhesive 38 which, in turn, may be attached to the base plate 16. The second member 72 may be a second part of a reclosable fastener and may have a first side 82 with a plurality of projections 84. A second side 86 of the second member 72 may be configured to receive a second adhesive 80 which may be attached to the object 12. The second adhesive 80 may be about the same width and length, or diameter as the second member 72. The second adhesive 80 may be an industrial strength double sided tape, or other similar type of adhesive as known to those of skill in the art. The first member 70 and the second member 72 may be substantially circular and substantially the same diameter as the base plate 16. The first member 70 and the second member 72 may each have a hole. The hole in the second member 72 may be slightly larger than the diameter of the flange 54 of the t-nut 46 and/or the head 57 or buck-tail 59 of the rivet 45. The hole in the first member 70 may be larger than the hole in the second member 72. Having the variation in hole size in the first member 70 and second member 72 may accommodate variability when attaching the first member 70 and second member 72 to each other. Although particular shapes and sizes are mentioned in detail, the shapes and sizes of the first and second members 70, 72 and the holes in the first and second members 70, 72 may vary in accordance with other embodiments of the invention.

The first member 70 may be removably connected to the second member 72 by engaging the plurality of projections 76 of the first side 74 of the first member 70 with the plurality of projections 84 of the first side 82 of the second member 72. The first member 70 may be disconnected from the second member 72 only after a separation force has been applied to the first and second members 70, 72 which may cause the plurality of projections 76 of the first side 74 of the first member 70 to disengage from the plurality of projections 84 of the first side 82 of the second member 72. The amount of separation force required may be adjusted by configuring the size and shape of the first and second members 70, 72, and therefore, the amount of plurality of projections 76, 84 that engage each other. In an embodiment, the separation force when applied directly along the centerline 44 of the holding device 10 may be approximately 160-170 $lb_f$. As the separation force is applied at an angle relative to the centerline 44 of the holding device 10, the separation force may be reduced and may be as low as approximately 10-12 $lb_f$. This may allow the object 12 attached to the holding device 10 to remain securely attached with a high separation force while also being configured to be removed with lower separation force if the user desires to remove the holding device 10 from the object 12. Although a particular example of separation forces required to separate the first member 70 from the second member 72 have been mentioned in detail, other separation forces may vary in accordance with other embodiments of the invention.

In an embodiment, the plurality of projections 76, 84 may comprise stems with mushroom-shaped tops such as the projections of the reclosable fasteners sold by 3M under the trademark DUAL LOCK™. In another embodiment, the plurality of projections 76, 84 may comprise a hook and loop configuration as known to those with skill in the art. For example, the plurality of projections 76 of the first member 70 may be comprised of loop material and the plurality of projections 84 of the second member 72 may be comprised of hook material. When the hook material of the second member 72 engages the loop material of the first member 70, a bond between the first member 70 and the second member 72 may be formed and may be maintained until the separation force is applied to the first and/or second members 70, 72. In addition to the above examples, any number of other reclosable fasteners as known to those with skill in the art may also be used in accordance with other embodiments of invention.

A strap 26 may be attached to the support plate 14 in some embodiments of the invention. In an embodiment where the support plate 14 has a plurality of slots 24, the strap 26 may be attached to the support plate 14 by threading the strap 26 through the plurality of slots 24. The strap 26 may be configured to attach to the support plate 14 such that the strap 26 may cover the head 58 of the fastener 48 and/or rivet 45, and if applicable, the bushing 69 as seen in FIG. 2. By covering the pivot device 18 with the strap 26, the supporting device 10 may have better tactile comfort when attached to an appendage of a person. Alternatively, the strap 26 may be configured to attach to the support plate 14 such that a portion of the strap 26 may be located between the base plate 16 and the support plate 14 as seen in FIG. 3. The strap 26 may have a hole that is slightly larger than the pivot device 18 and the pivot device may be pass through the hole in the strap 26.

The strap 26 may have a bracket 88 attached to one end of the strap 26. The strap 26 may be threaded through the bracket 88 to create a loop area 90. The loop area 90 of the strap 26 may be made smaller by tightening the strap 26, allowing the support plate 14, and ultimately the attached object 12, to be secured to the article placed within the loop area 90, such as an appendage of the person, or other articles that a person may use to secure the supporting device 10. The loop area 90 of the strap 26 may be made larger or smaller using only one hand to adjust the size of the loop area 90. The strap 26 may secure the size of the loop area 90 using a hook and loop configuration or other reclosable fasteners as known to those with skill in the art. For example, a portion of an end of the strap 26 may be equipped with a hook material and a portion of a surface of the strap 26 may be equipped with a loop material. The portion of the surface of the strap 26 equipped with a loop material may be large enough to allow adjustment to the size of the loop area 90 used for securing the article, such as the appendage of the person.

The strap 26 may also be configured to have a specific length to correspond to the size of the article the supporting device 10 is secured to. For example, the strap 26 may have a short length when the supporting device 10 is secured to the hand of the person, and the strap 26 may have a longer length when the supporting device 10 is secured to the leg of the person. While specific examples are provided, the strap 26 with the short length or long length may be used to secure other articles to the supporting device 10 as known to those with skill in the art. As seen in FIG. 4, more than one strap 26 may be used at the same time to form a larger loop area $90_2$ instead of the loop area $90_1$ formed by one strap. In other words, a plurality of straps 26 may be chained together to create the larger loop area $90_2$. For example, in an embodiment using two straps, a first strap $26_1$ may be attached to the holding device as described above. A second strap $26_2$ may be chained to the first strap $26_1$ by threading the end of the first strap $26_1$ equipped with a hook material through the bracket $88_2$ of the second strap and securing the hook material to the loop material of the first strap. The end of the second strap $26_2$ equipped with a hook material may be threaded through the bracket $88_1$ of the first strap to create the larger loop area $90_2$. Although a particular example using two straps 26 to form the larger loop area $90_2$ has been mentioned in detail, any number of straps may used to form various sizes for the loop area 90 in accordance with other embodiments of the invention.

The strap 26 may be made from a synthetic rubber. The strap 26 may also have a fabric coating over the synthetic rubber. The strap 26 may also be coated with an antimicrobial coating. The strap 26 may also have an elastic characteristic in embodiments using the synthetic rubber. In an embodiment, the strap 26 may also include a pad 91. The pad 91 may be used increase tactile feel of the supporting device 10 by separating and cushioning a portion of the support plate 14 and portion of the pivot device 18 from the article, such as the appendage of a person using the supporting device 10. The pad 91 may be attached to the strap 26 as seen in FIGS. 2 and 4. When the pad 91 is attached to the strap 26, the pad 91 may reinforce the strap 26 to reduce the amount of elasticity the strap 26 has where the pad 91 and the strap 26 overlap. The bracket 88 may be attached to an end of the pad 91. The pad 91 may also be unattached to the strap 26 as seen in FIG. 3. When unattached to the strap 26, the pad 91 may be attached to the support plate 14. The pad 91 may be made out of cloth material, including, but not limited to felt.

FIG. 5 illustrates an exploded perspective view of an embodiment of a supporting system 100 configured to support the object 12. The supporting system 100 may comprise the supporting device 10, 11 (as described above and illustrated in FIGS. 1-3) and the adapter plate 20.

The adapter plate 20 may be configured to receive the support plate 14 of the supporting device 10, 11. The adapter plate 20 may have a plurality of grooves 102 that may accept the first edge 28 and the second edge 30 of the support plate 14. In an embodiment, each of the plurality of grooves 102 may have an open end 104 and a closed end 106. The open end 104 may have a chamfer to help ease insertion of the support plate 14 to the adapter plate 20. As the support plate 14 slides in the plurality of grooves 102 of the adapter plate 20 starting from the open end 104, the support plate 14 may be positioned relative to the adapter plate 20 when the support plate 14 engages at least one of the closed ends 106 of the plurality of grooves 102. The support plate 14, and ultimately the object 12 attached to the supporting device 10, 11, may be secured to the adapter plate 20 with a retaining pin 108. The retaining pin 108 may slide through a plurality of holes 110 proximately located on the plurality of grooves 102. In an embodiment, the plurality of holes 110 are located proximate to the open end 104 of the plurality of grooves 102. The retaining pin 108 may have a detent mechanism 112 integrated near the tip of the retaining pin 108 to secure the retaining pin 108 to the adapter plate 20. Alternatively, the support plate 14 may be secured to the adapter plate 20 while positioned in the plurality of grooves 102 with the detent mechanism 34 directly attached to the adapter plate 20. The detent mechanism 34 may securely hold the support plate 14, and ultimately, the supporting device 10, 11 to the adapter plate 20 by engaging the notch 32 on the support plate 14. Although one detent mechanism 34 is shown in a center location of the adapter plate 20 in accordance with an embodiment of the invention, fewer or more detent mechanisms 34 may be used (along with fewer or more notches 32 on the support plate 14) and/or the location of the detent mechanism 34 may vary in accordance with other embodiments of the invention. The detent mechanism 34 may be any spring loaded device used to arrest movement as known to those with skill in the art.

In another embodiment, the second end of each of the plurality of grooves 102 may be an open end 104 (not shown) instead of a closed end. As the support plate 14 slides in the plurality of grooves 102 of the adapter plate 20 starting either from the first open end 104 or the second open end (not shown), the detent mechanism 34 attached to the adapter plate 20 may engage the notch 32 located on the support plate 14. The detent mechanism 34 may position and securely hold the support plate 14, and ultimately, the supporting device 10 relative to the adapter plate 20.

In another embodiment, the adapter plate 20 may be configured to receive a portion of the pivot device 18 which is located in the space between the support plate 14 and the base plate 16. The adapter plate 20 may have a slot. The slot may be wider than the width or diameter of the pivot device 18. The supporting device 10, 11 may slide onto the slot of the adapter plate 20. The support device 10, 11 may be positioned such that the portion of the pivot device 18 located in the space between the support plate 14 and the base plate 16 may engage an end of the slot located in the adapter plate 20. The adapter plate 20 may have a thickness that is smaller than the distance between the support plate 14 and base plate 16.

The adapter plate 20 is configured for use with the supporting device 10, 11. The adapter plate 20 may be u-shaped having a center portion 114 and two side portions 116 defining a channel. The two side portions 116 may have an outside wall surface 118 and an inside wall surface 120. The inside wall surface 120 of each of the two side portions 116 may each include one of the plurality of grooves 102. The grooves 102 may be positioned on the side portions 116 such there may be space for the strap 26 between the support plate 14 and the center portion 114 of the adapter plate 20 in the channel for those embodiments of the support device 10, 11 that have the strap 26. The adapter plate 20 may have a plurality of mounting holes 122. In an embodiment, the center portion 114 of the adapter plate 20 may have two mounting holes 122. The adapter plate 20 may be made of plastic. For example, and without limitation, the plastic may be high strength/impact plastic, including, but not limited to, polyvinyl chloride (PVC), high density polypropylene (HDPP), polycarbonate (PC), acrylonitrile butadiene styrene (ABS), PC/ABS, and clear acrylic plastic. Although various plastics are mentioned in detail, the adapter plate 20 may comprise any number of various materials in accordance with various embodiments of the invention.

As illustrated in FIGS. 5-10, the supporting system 100 may further comprise a load-bearing device 124. The adapter plate 20 of the supporting system 100 may be attached to the load-bearing device 124 using one or more of the mounting holes 122 on the center portion 114 of the adapter plate 20. The load-bearing device 124 may be used to support and position the object 12 attached to supporting device 10, 11 when the support plate 14 is attached to the adapter plate 20. The load-bearing device 124 may comprise a support component 126 and an adjustment component 128. The adjustment component 128 may have a first end 130 that may be connected to the adapter plate 20, a second end 132 that may be connected to the support component 126, and a pivot mechanism 134 positioned between the first end 130 and the second end 132. As illustrated in FIGS. 5-10, the pivot mechanism 134 may be a ball and socket configuration as known to those with skill in the art. The ball portion may pivot in the socket portion and may be secured in a specific position with an adjustment knob.

The support component 126 of the load-bearing device 124 may comprise any number of various embodiments. For example, in an embodiment as illustrated in FIG. 6, the support component 126 may comprise a one-piece stand 136. The one-piece stand 136 may have a base portion 138 and an extension portion 140, where the base portion 138 and the extension portion 140 are integrally-formed from one component. The base portion 138 may have a flat planar area configured to allow the load-bearing device 124 to have self-stability while supporting the weight of the object 12, such as, but not limited to, a tablet computer. A plurality of feet 142 may be attached to a bottom surface 144 of the base portion 138. The plurality of feet 142 may separate the bottom surface 144 from a surface that the support component 126 may rest on, such as a table top, desk top, counter top, and/or other similar surfaces. The base portion 138 may have a groove 146 which may be used for positioning articles, such as, but not limited to, a keyboard and a writing utensil. The extension portion 140 may vertically rise from the base portion 138. The extension portion 140 may be configured at an angle α such that the extension portion 140 is above the flat planar area of the base portion 138. An end of the extension portion 140 may be attached to the second end 132 of the adjustment component 128 of the load-bearing device 124. The support component 126 may be made of plastic. For example, and without limitation, the plastic may comprise an acrylic plastic. The plastic may be transparent in accordance with an embodiment of the invention.

In another embodiment as illustrated in FIG. 7, the support component 126 may comprise a two-piece stand 147. The two-piece stand 147 may include the base portion 138 and the extension portion 140. The base portion 138 may have a flat planar area configured to allow the load-bearing device 124 to have self-stability while supporting the weight of the object 12, such as, but not limited to, a tablet computer. The plurality of feet 142 may be attached to the bottom surface 144 of the base portion 138 to separate the bottom surface 144 from a surface that the support component 126 is positioned on top of, such as a table top, desk top, counter top, and/or whatever similar surface the user may wish to place the support component 126 on. The base portion 138 may have the groove 146 which may be used for positioning articles, such as, but not limited to, a keyboard and a writing utensil. The extension portion 140 is attached to the base portion 138 and may vertically rise from the base portion 138. The extension portion 140 may be configured such that the extension portion 140 is above the flat planar area of the base portion 138. An end of the extension portion 140 may be attached to the second end 132 of the adjustment component 128 of the load-bearing device 124. The support component 126 may be made of plastic. For example, and without limitation, the plastic may comprise an acrylic plastic. The plastic may be transparent or opaque in accordance with various embodiments of the invention. The plastic used for the base portion 138 and the plastic for the extension portion 140 may be made from different plastics and/or may comprise different colors.

In another embodiment as illustrated in FIG. 8, the support component 126 may comprise a tripod 148. The tripod 148 may have a major leg 150 and two minor legs 152. The major leg 150 may be longer than the two minor legs 152. Each leg 150, 152 may have a pivot end 154 and a foot end 156. A portion of the pivot end 154 of the major leg 150 may be attached to the second end 132 of the adjustment component 128 of the load-bearing device 124. Each foot end 156 may have a rubber foot. The attachment may be configured such that the minor legs 152 may pivot relative to the major leg 150. Each leg 150, 152 may have a long axis which runs from the center of the pivot end 154 to the center of the foot end 156. The minor legs 152 may be attached to the major leg 150 proximate to the pivot end 154 of each leg 150, 152. When the minor legs 152 are positioned such that the minor legs 152 are fully extended, the support component 126 may be self-stabilizing and may support the object 12. When the tripod 148 is in the fully extended position, each of the long axis of the minor legs 152 may be approximately perpendicular to the long axis of the major leg 150. Additionally, when the tripod 148 is in the fully extended position, the long axis of minor legs 152 may be approximately perpendicular or have an angle greater than 90 degrees relative to each other. The tripod 148 may also have a fully closed position. The tripod 148 may be in the fully closed position when the minor legs 152 are pivoted, or folded back, such that the long axis of all the legs 150, 152 are substantially parallel relative to each other. When the tripod 148 is in the fully closed position, the support component 126 may have a smaller overall profile, which may be used for traveling purposes. The tripod 148 may be made out of metal or plastic. In embodiments where the legs 150, 152 of the tripod 148 are made of plastic, the plastic may be high strength/impact plastic, including, but not limited to, polyvinyl chloride (PVC), high density polypropylene (HDPP), polycarbonate (PC), acrylonitrile butadiene styrene (ABS), and PC/ABS.

Figure 9:
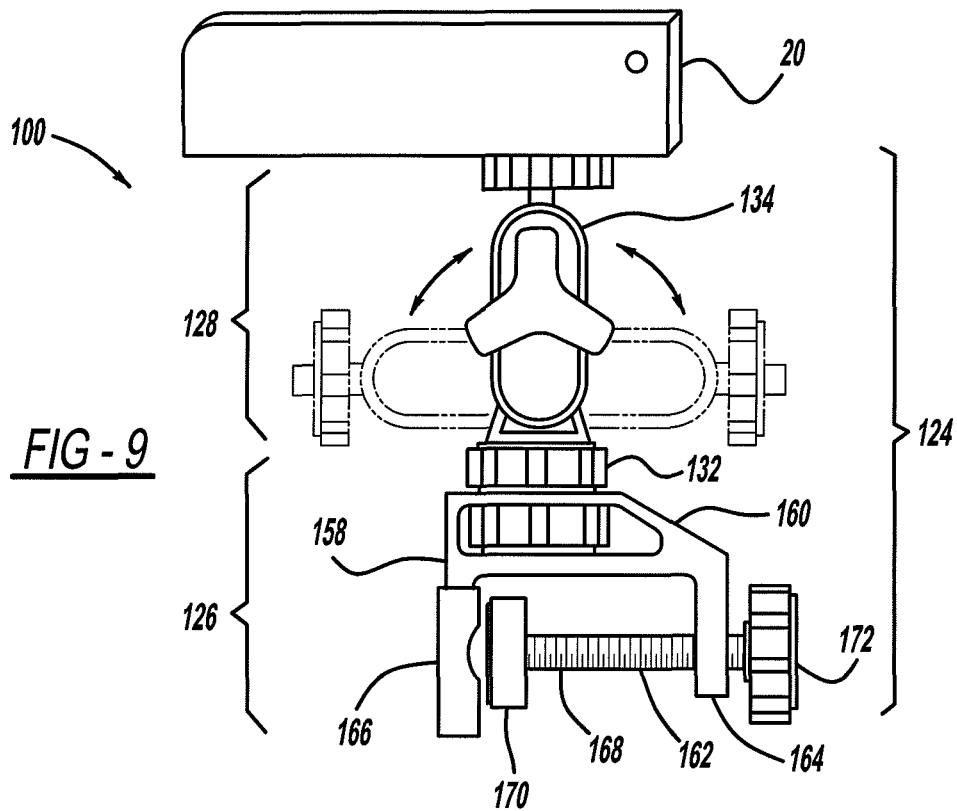
FIG. 9 is a side view of an embodiment of the supporting system.

In another embodiment as illustrated in FIG. 9, the support component 126 may comprise a c-clamp 158. The support component 126 may also comprise an extension portion 140 (not shown in FIG. 9) which may be located between the c-clamp 158 and the adjustment component 128 of the load-bearing device 124. The c-clamp 158 may have a c-shape bracket 160 and a clamp component 162. The c-shape bracket 160 may have a first leg 164 and a second leg 166. The c-shape bracket 160 may be attached to the second end 132 of the adjustment component 128 of the load-bearing device 124. The clamp component 162 may comprise a threaded body 168 having a clamp end 170 and a knob end 172. The threaded body 168 may be configured to go through a thread hole (not shown) in the first leg 164 of the c-shape bracket 160. The knob end 172 may be used to adjust the threaded body 168 such that the clamp end 170 moves closer or farther from the second leg 166 of the c-shape bracket 160. The clamp end 170 of the clamp component 162 and the second leg 166 of the c-shape bracket 160 may be equipped with a foot. An article may be trapped between the foot on the clamp end 170 and the foot on the second leg 166 of the c-shape bracket 160 by adjusting the distance between the two feet to be slightly smaller than the portion of the article being trapped. The support component 126 may be as self-stabilized as the object 12 which is trapped between the two feet. For example, if the c-clamp 158 has trapped a table top, the c-clamp may be as self stabilized as the table top.

Figure 10:
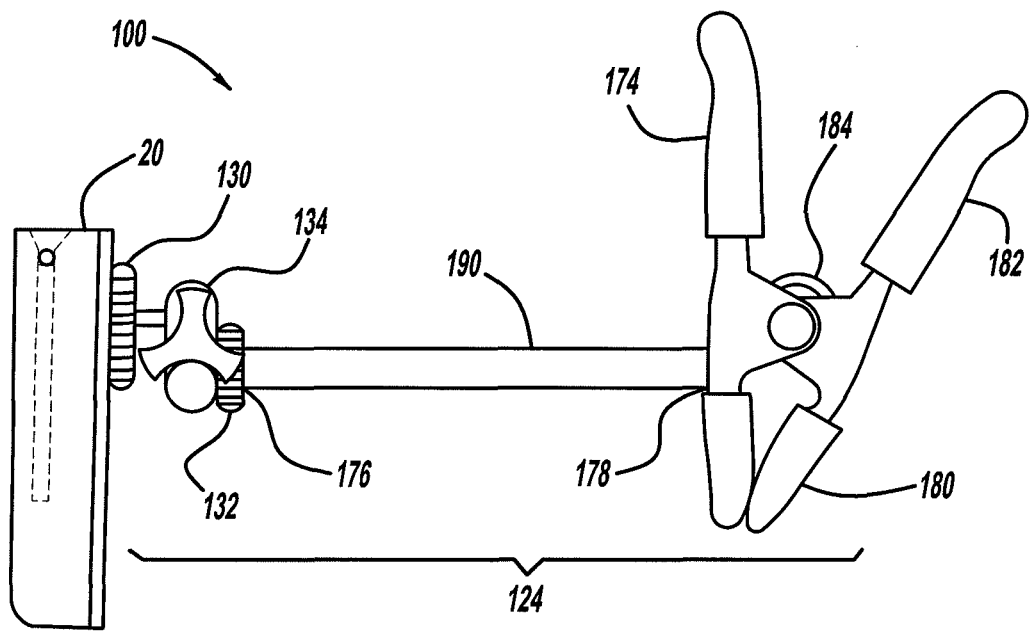
FIG. 10 is a side view of an embodiment of the supporting system.

In another embodiment as illustrated in FIG. 10, the support component 126 may comprise the extension portion 140 and a spring clamp 174. The extension portion 140 may have a first end 176 and a second end 178. The first end 176 of the extension portion 140 may be attached to the second end 132 of the adjustment component 128 of the load-bearing device 124. The second end 178 of the extension portion 140 may be connected to the spring clamp 174. The spring clamp 174 may have a clamp portion 180, a handle portion 182, and a spring 184 configured as known to those with skill in the art. The handle portion 182 may be used to open the clamp portion 180. When the handle portion 182 is released, the clamp portion 180 may close due to the spring 184 and may trap an article in the clamp portion 180 with a clamping force. The clamping force may be controlled by the size of the spring clamp 174 and the characteristics of the spring 184. The support component 126 may be as self-stabilized as the object 12 which is trapped in the clamp portion 180. For example, if the spring clamp 174 has trapped a cabinet door, the support component 126 may be as self stabilized as the cabinet door.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A supporting device for an object, the supporting device comprising:
    a support plate including a pad and a first strap that are attached to the support plate, wherein the support plate has two substantially parallel edges and two outwardly curved edges so as to fit in the palm of a person's hand, and the first strap extends from the outwardly curved edges in a direction that is substantially parallel with the parallel edges and is configured to wrap around the person's hand for securing the supporting device in the palm of the person's hand, and wherein the support plate further includes at least one slot disposed between the two substantially parallel edges and between the two outwardly curved edges and at least one of the first strap and the pad is threaded through the at least one slot;
    a base plate;
    a pivot device having a centerline axis, wherein the pivot device is configured to attach the base plate to the support plate, and the base plate is configured to rotate 360 degrees about the centerline axis of the pivot device relative to the support plate;
    a fastening device having a first member and a second member, wherein:
        the first member has a first side including a plurality of projections and a second side including a first adhesive configured to attach the first member to the base plate;
        the second member has a first side including a plurality of projections and a second side including a second adhesive configured to attach the second member to the object; and
        the plurality of projections of the first side of the first member and the plurality of projections of the first side of the second member are configured to removably connect the first member to the second member and wherein the first member is disconnected from the second member only after a separation force is applied to the first and second members.

2. The supporting device of claim 1, wherein the pivot device comprises a t-nut and a fastener and wherein the t-nut is configured to receive the fastener.

3. The supporting device of claim 2, wherein the pivot device further comprises a first washer, a second washer, and a third washer, wherein the first washer, second washer, and third washer are disposed between the support plate and the base plate, and wherein the third washer is a spring washer disposed between the first washer and the second washer.

4. The supporting device of claim 1, wherein the pivot device comprises a rivet.

5. The supporting device of claim 1, further comprising a bracket attached to an end of the pad.

6. The supporting device of claim 5, wherein the first strap is configured to receive at least one removably connectable additional strap.

7. The supporting device of claim 6, further comprising a plurality of straps, wherein the first strap is connected to the support plate and at least a second strap is removably connected to the first strap.

8. The supporting device of claim 1, wherein the pad is threaded through the at least one slot of the support plate and the support plate further comprises a second slot through which the first strap is threaded.

9. The supporting device of claim 1, wherein the support plate has a cavity and a portion of the base plate is disposed within the cavity of the support plate.

10. The supporting device of claim 1, wherein at least one of the support plate and the pad is substantially round so as to fit in the palm of a person's hand.

11. The supporting device of claim 1, wherein at least one of the support plate and the pad is substantially concave so as to fit in the palm of a person's hand.

* * * * *